United States Patent [19]
Tommeraasen

[11] Patent Number: 5,800,078
[45] Date of Patent: Sep. 1, 1998

[54] EARTHQUAKE ATTENUATING APPARATUS

[76] Inventor: Paul E. Tommeraasen, 2532 High Crest, Beloit, Wis. 53511

[21] Appl. No.: 419,187

[22] Filed: Apr. 10, 1995

[51] Int. Cl.$^6$ .................. E02D 27/34; E02D 31/08; E04B 1/98
[52] U.S. Cl. .................. 405/258; 52/1; 52/167.1; 52/167.2; 52/169.1
[58] Field of Search .................. 52/1, 167.1, 167.2, 52/167.4, 169.1, 169.2, 169.3, 169.4, 169.9, 173.1, 302.1, 302.3, 750; 405/229, 258

[56] References Cited

U.S. PATENT DOCUMENTS

| | | | |
|---|---|---|---|
| 3,015,912 | 1/1962 | Fistedis | 52/169.1 X |
| 4,484,423 | 11/1984 | McClure, Jr. | 52/169.1 X |
| 4,587,779 | 5/1986 | Staudacher | 52/167.2 |
| 4,707,956 | 11/1987 | Sato | 52/169.9 X |
| 5,233,797 | 8/1993 | Uno et al. | 52/1 |

FOREIGN PATENT DOCUMENTS

| | | | |
|---|---|---|---|
| 2660353 | 10/1991 | France | 52/167.1 |
| 3-47379 | 2/1991 | Japan | 52/167.2 |
| 1477870 | 5/1989 | U.S.S.R. | 52/167.2 |
| 1761876 | 9/1992 | U.S.S.R. | 52/167.1 |

*Primary Examiner*—Carl D. Friedman
*Assistant Examiner*—Kevin D. Wilkens
*Attorney, Agent, or Firm*—David J. Archer

[57] ABSTRACT

An earthquake attenuating apparatus is located adjacent to a fault line for reducing the intensity of a potential earthquake. The apparatus includes a vibration generator which is located adjacent to the fault line and a vibration transmitter for transmitting the vibration to the fault line such that when the vibration generator is operating, the vibration transmitter transmits vibrations to the fault line so that the intensity of the potential earthquake is reduced.

8 Claims, 1 Drawing Sheet

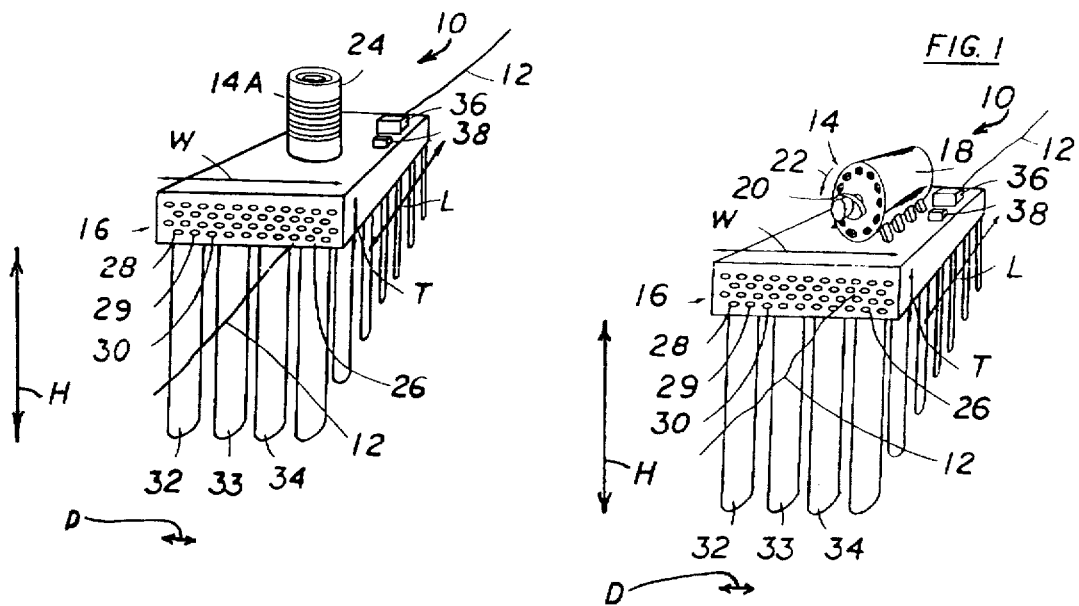
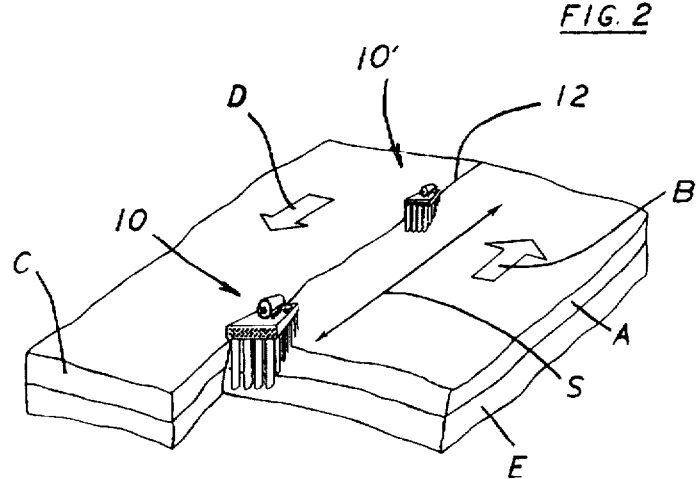

EARTHQUAKE ATTENUATING APPARATUS

BACKGROUND OF THE INVENTION

1. Field of the Invention

The present invention relates to an earthquake attenuating apparatus for location adjacent to a fault line for reducing the intensity of the potential earthquake.

More particularly, the present invention relates to an earthquake attenuating apparatus that generates vibrations which tend to decrease the magnitude of a potential earthquake.

2. Information Disclosure Statement

The earth's crust is made up of a number of tectonic plates. A fault line is a break in the earth's crust along which there has been movement. Convection currents within the earth's mantle cause continual movement in the lithosphere of the plates along the fault line and the rocks become bent in an anticline or syncline line disposition. When the strain of the bent rock exceeds the strength of the rocks, a rupture will occur followed by rapid release of seismic energy at the epicenter of an earthquake. This is known as elastic rebound. If the plates try to pass each other in opposite directions, a strikeslip fault line will occur which is known as a transform boundary. Such transform boundary describes the San Andreas fault in California.

The present invention seeks to overcome the aforementioned problem by decreasing the intensity of energy and subsequent rarefaction in the rocks from elastic strain. Potential seismic activity is reduced by the activation of low intensity vibration to the earth's crust at the aforementioned fault line.

More particularly, the vibration has the capability of nullifying friction. Consequently, the seismic forces would be dissipated gradually over a long period of time thereby causing the smooth movement between the respective plates.

According to the present invention, vibration units would be built and installed at intervals along the fault. A typical unit would include a motor coupled to a signal generator, such being set on a base designed to effectively transmit a mechanical vibration to the ground. The unit would be velocity controlled to adjust to the most effective frequency. A readout of the complete spectrum of frequencies and amplitudes would show all natural frequencies. Accordingly, the excitation of the frequency would be set to the most effective resonant frequency.

Therefore, it is a primary objective of the present invention to provide an apparatus for location adjacent to a fault line for reducing the intensity of a potential earthquake.

Other objects and advantages of the present invention will be readily apparent to those skilled in the art by a consideration of the detailed description contained hereinafter taken in conjunction with the annexed drawings.

SUMMARY OF THE INVENTION

The present invention relates to an earthquake attenuating apparatus for location adjacent to a fault line for reducing the intensity of a potential earthquake. The apparatus includes means for generating vibration, the means being located adjacent to the fault line. The apparatus also includes means for transmitting the vibrations to the fault line such that when the means for generating the vibration is operating, the transmitting means transmits the vibrations to the fault line so that the intensity of the potential earthquake is reduced.

In a more specific embodiment of the present invention, the means for generating vibration includes an electric motor and an eccentric mechanism driven by the motor such that when the eccentric mechanism is rotated by the motor, rotation of the eccentric mechanism generates the vibration. More specifically, the electric motor is of at least 1000 horse power and is driven by a direct current source of electricity.

Additionally, the electric motor is preferably a variable speed motor that rotates within the range 1 to 3,600 revolutions per minute. In an alternative embodiment of the present invention, the means for generating vibration includes an electromagnetic oscillator.

The means for transmitting includes a concrete slab that is reinforced and preferably prestressed. The concrete slab has a length within the range 75 to 125 ft. and a width within the range 25 to 75 ft. and has a thickness within the range 5 to 15 ft.

The means for transmitting also includes a plurality of concrete piles that are secured to the slab and extend downwardly therefrom. Each of the piles has a diameter within the range 3 ft. to 9 ft. and a depth within the range 30 ft. to 50 ft.

The apparatus also includes sensor means for sensing the resonance point of the means for generating vibration.

Additionally, control means are electrically connected to the sensor means for controlling the means for generating vibration such that the means for generating vibration is maintained at the resonance point so that the application of vibration is maximized.

In a preferred embodiment of the present invention, the means for generating vibration is operated for 20% of the time for a set period.

More specifically, the means for generating vibration is operated for one year in a five year period and is preferably operated continuously for one year in the aforementioned five year period.

In a preferred embodiment of the present invention, the apparatus is spaced from other identical apparatus also located on the fault line with each apparatus being spaced from an adjacent apparatus by a distance within the range thirty miles.

Many modifications and variations of the present invention will be readily apparent to those skilled in the art by a consideration of the detailed description contained hereinafter taken in conjunction with the annexed drawings. However, such modifications and variations fall within the spirit and scope of the present invention as defined by the appended claims.

BRIEF DESCRIPTION OF THE DRAWINGS

FIG. 1 is a perspective view of the apparatus according to the present invention located adjacent to a fault line;

FIG. 1A is a perspective view similar to that shown in FIG. 1 but shows an alternative embodiment of the present invention; and FIG. 2 is a perspective view of a series of apparatus according to the present invention space along a fault line.

Similar reference characters refer to similar parts throughout the various views of the drawings.

DETAILED DESCRIPTION OF THE DRAWINGS

FIG. 1 is a perspective view of an earthquake attenuating apparatus generally designated 10 according to the present invention for location adjacent to a fault line 12 for reducing the intensity of a potential earthquake. The apparatus includes means generally designated 14 for generating vibration. The means 14 is located adjacent to the fault line 12.

The apparatus 10 also includes means generally designated 16 for transmitting the vibration to the fault line 12 such that when the means 14 for generating vibration is operating, the transmitting means 16 transmits the vibrations to the fault line 12 so that the intensity of the potential earthquake is reduced.

As shown in FIG. 1, the means 14 for generating vibration includes an electric motor 18 and an eccentric mechanism 20 driven by the motor 18 such that when the eccentric mechanism 20 is rotated as indicated by the arrow 22, by the motor 18, rotation of the eccentric mechanism 20 as indicated by the arrow 22 generates the vibration.

In a preferred embodiment of the present invention, the electric motor 18 is of at least 1000 horse power and is driven by a direct current source of electricity. Additionally, preferably the electric motor 18 is a variable speed motor 18 which rotates within the range 1 to 3600 revs. per minute.

In an alternative embodiment of the present invention as shown in FIG. 1A, the means 14a for generating vibration includes an electro magnetic oscillator 24.

In both embodiments of the present invention, the means 16 for transmitting includes a concrete slab 26 which is reinforced with steel bars 28, 29 and 30. Preferably the concrete slab 26 is prestressed.

Additionally, the concrete slab 26 has a length L within the range 75 to 125 ft. and a width W within the range 25 to 75 ft. and a thickness T within the range 5 to 15 ft.

The means 16 for transmitting further includes a plurality of concrete piles 32, 33 and 34 secured to the slab 26 and extending downwardly therefrom.

The piles 32, 33 and 34 each have a diameter D within the range 3 to 9 ft. and a depth H within the range 30 to 50 ft.

The apparatus 10 also includes sensor means 36 for sensing the resonant point of the means 14 for generating vibration.

Additionally, the apparatus 10 includes control means 38 electrically connected to the sensor means 36 for controlling the speed of the means 14 for generating vibration such that the means 14 for generating vibration is maintained at the resonant point so that the application of vibration is maximized.

The means 14 for generating vibration is also operated for 20% of the time for a set period.

More specifically, the means 14 for generating vibration is operated for one year in a five year period and in a preferred method is operated continuously for one year in any five year period.

FIG. 2 is a perspective view showing a number of apparatus according to the present invention spaced along the fault line 12 with each apparatus 10 being spaced from an adjacent apparatus 10' by a distance S within the range 30 to 70 miles.

FIG. 2 also shows diagrammatically the fault line 12 or transform boundary defined between a first plate A moving in the direction of arrow B and a second plate C moving in the direction of arrow D. Both plates are located above the asthenosphere E.

In operation of the apparatus 10 according to the present invention, the motor 18 is energized for driving the eccentric mechanism 20.

In a preferred embodiment of the present invention, the means 14 for generating vibration is operated 20% of the time for the set period.

The means 14 for generating vibration is operated for one year in a five year period and is preferably operated continuously for one year in the aforementioned five year period.

The present invention, by the generation of vibration tends to dissipate the sheer forces along a fault line thereby reducing the magnitude of a potential earthquake.

The damage caused by earthquakes does not increase proportionately to the intensity of the earthquake according to the reading of the magnitude of the earthquake on the Richter Scale. In other words, an earthquake having a magnitude of eight on the Richter Scale will not cause twice the amount of damage caused by an earthquake reading of four on the Richter Scale. Such intervals 1 through 8.7 are set at 30 times the previous number on the Richter Scale and not in linear form. A reading of three on the Richter Scale would probably be felt as a minor tremor with no property damage. However an earthquake with a magnitude of eight on the Richter Scale would undoubtedly result in total destruction in demographically populated areas located near the epicenter. Therefore, the present invention by dissipating the intensity of a potential earthquake will greatly reduce the destructive force of such earthquake.

What is claimed is:

1. An earthquake attenuating apparatus for location adjacent to a fault line for reducing the intensity of a potential earthquake, said apparatus comprising:

means for generating vibration, said means being located adjacent to the fault line;

said means for generating vibration including:

a plurality of vibration units, each of said units including:
a motor;
a signal generator coupled to said motor for effectively transmitting a mechanical vibration to the ground;

said signal generator including:
an eccentric mechanism driven by said motor such that when said eccentric mechanism is rotated by said motor, rotation of said eccentric mechanism generates said vibration, the arrangement being such that potential seismic activity is reduced by the application of said vibration to the earth's crust at the aforementioned fault line; and transmitting means supporting said means for generating vibration, said transmitting means being disposed on the fault line for transmitting said vibration to the fault line;

said transmitting means including:
a base;
a plurality of concrete piles secured to said base and extending downwardly therefrom the arrangement being structured such that when said means for generating vibration is operating, said transmitting means transmits said vibration to the fault line to dissipate sheer forces along the fault line such that said potential seismic activity is dissipated gradually over a long period of time thereby causing a smooth movement between adjacent tectonic plates of the earth's crust in the vicinity of the fault line so that the intensity of the potential earthquake is reduced.

2. An earthquake attenuating apparatus as set forth in claim 1 wherein said piles each have a diameter with a range 3 to 9 ft. and a depth within the range 30 to 50 ft.

3. An earthquake attenuating apparatus as set forth in claim 1 further including:

sensor means for sensing the resonance point of said means for generating vibration, control means electrically connected to said sensor means for controlling the speed of said means for generating vibration such that said means for generating vibration is maintained at said resonance point so that the application of vibration is maximized.

4. An earthquake attenuated apparatus as set forth in claim 1 wherein each of said units is spaced from another identical unit of said plurality of units located on said fault line, each unit being spaced from an adjacent unit by a distance within the range 30 to 70 miles.

5. An earthquake attenuating apparatus as set forth in claim 1 wherein said base includes:

a concrete slab.

6. An earthquake attenuating apparatus as set forth in claim 5 wherein said concrete slab is reinforced.

7. An earthquake attenuating apparatus as set forth in claim 5 wherein said concrete slab is prestressed.

8. An earthquake attenuating apparatus as set forth in claim 5 wherein said concrete slab has a length within the range 75 to 125 ft. and a width within the range 25 to 75 ft. and a thickness within the range 5 to 15 ft.

\* \* \* \* \*